(12) United States Patent
Lorgouilloux

(10) Patent No.: US 11,185,841 B2
(45) Date of Patent: Nov. 30, 2021

(54) HIGHLY POROUS POWDERED SLAKED LIME COMPOSITION

(71) Applicant: S. A. Lhoist Recherche et Developpement, Ottignies-Louvain-la-Neuve (BE)

(72) Inventor: Marion Lorgouilloux, Strepy Bracquegnies (BE)

(73) Assignee: S. A. Lhoist Recherche et Developpement, Ottignies-Louvain-la-Neuve (BE)

( * ) Notice: Subject to any disclaimer, the term of this patent is extended or adjusted under 35 U.S.C. 154(b) by 463 days.

(21) Appl. No.: 16/309,561

(22) PCT Filed: Jun. 23, 2017

(86) PCT No.: PCT/EP2017/065528
§ 371 (c)(1),
(2) Date: Dec. 13, 2018

(87) PCT Pub. No.: WO2017/220775
PCT Pub. Date: Dec. 28, 2017

(65) Prior Publication Data
US 2019/0193049 A1    Jun. 27, 2019

(30) Foreign Application Priority Data

Jun. 24, 2016  (BE) .................................. 2016/5465
Jun. 24, 2016  (WO) ................. PCT/EP2016/064701

(51) Int. Cl.
| | | |
|---|---|---|
| B01J 20/04 | (2006.01) | |
| C01F 11/02 | (2006.01) | |
| B01J 20/28 | (2006.01) | |
| B01D 53/40 | (2006.01) | |
| C04B 2/04 | (2006.01) | |
| B01D 53/83 | (2006.01) | |

(52) U.S. Cl.
CPC ............ *B01J 20/041* (2013.01); *B01D 53/40* (2013.01); *B01D 53/83* (2013.01); *B01J 20/28004* (2013.01); *B01J 20/28016* (2013.01); *B01J 20/28057* (2013.01); *B01J 20/28059* (2013.01); *B01J 20/28069* (2013.01); *B01J 20/28071* (2013.01); *B01J 20/28085* (2013.01); *C01F 11/02* (2013.01); *C04B 2/04* (2013.01); *B01D 2251/404* (2013.01); *B01D 2253/302* (2013.01); *B01D 2253/304* (2013.01); *B01D 2257/2045* (2013.01); *B01D 2257/2047* (2013.01); *B01D 2257/302* (2013.01); *B01D 2257/404* (2013.01); *B01D 2258/0283* (2013.01); *C01P 2004/53* (2013.01); *C01P 2004/61* (2013.01); *C01P 2006/12* (2013.01); *C01P 2006/14* (2013.01); *C01P 2006/16* (2013.01)

(58) Field of Classification Search
CPC ................ B01J 20/041; B01J 20/28004; B01J 20/28016; B01J 20/28057; B01J 20/28059; B01J 20/28069; B01J 20/28071; B01J 20/28085; B01D 53/40; B01D 53/83; C04B 2/04; C01F 11/02
See application file for complete search history.

(56) References Cited

U.S. PATENT DOCUMENTS

| | | | |
|---|---|---|---|
| 4,208,388 A * | 6/1980 | Nicholson | ............... C01F 11/02 423/268 |
| 5,173,279 A | 12/1992 | Dumont et al. | |
| 5,223,239 A | 6/1993 | Moran et al. | |
| 6,322,769 B1 * | 11/2001 | Langelin | ................... C04B 2/04 423/635 |
| 2009/0246117 A1 | 10/2009 | Tilquin et al. | |

FOREIGN PATENT DOCUMENTS

WO    1997/014650    4/1997

OTHER PUBLICATIONS

PCT/EP2017/065528, International Patent Appl. Search Report, 2 pages, dated Aug. 11, 2017.

* cited by examiner

*Primary Examiner* — James A Fiorito
(74) *Attorney, Agent, or Firm* — Charles D. Gunter, Jr.

(57) ABSTRACT

The present invention concerns a powdery slaked lime composition having an Alpine fluidity greater than 50% and including a first fraction of particles having a size less than 32 μm and a second fraction of particles with the size greater than 32 μm, the second fraction being less than 10% by weight, compared to the total weight of the composition. The invention also relates to a method for producing same.

11 Claims, No Drawings

HIGHLY POROUS POWDERED SLAKED LIME COMPOSITION

The present invention concerns a composition of powdery slaked lime having a BET specific surface obtained by adsorption of nitrogen, greater than or equal to 25 m$^2$/g and a total BJH pore volume, constituted of pores, the diameter of which are less than 1000 Å, greater than or equal to 0.15 cm$^3$/g.

Calcium oxide, CaO, is often called "quicklime", whereas calcium hydroxide, Ca(OH)$_2$ is called "hydrated lime" or "slaked lime", both compounds being informally called "lime". In other terms, lime is an industrial product respectively based on the oxide or hydroxide of calcium.

By "quicklime", we mean a solid mineral material the chemical composition of which is principally calcium oxide, CaO. Quicklime is generally obtained by calcination of limestone (principally CaCO$_3$).

Quicklime may also contain impurities such as magnesium oxide, MgO, sulphur oxide, SO$_3$, silica, SiO$_2$, or even alumina, Al$_2$O$_3$, . . . , the sum of these being several % in weight. Here the impurities are expressed in their oxide form, but obviously, they may appear in different phases. Quicklime also usually contains several % in weight of residual limestone, called unburnt residue.

The quicklime appropriated according to the present invention may include MgO, expressed in the form of MgO, in a quantity comprised in the range 0.5 to 10% by weight, for preference less than or equal to 5% by weight, more preferentially less than or equal to 3% by weight, and in a preferential manner less than or equal to 1% by weight compared to the total weight of quicklime.

Typically, to make slaked lime, quicklime is used in the presence of water. The calcium oxide in quicklime rapidly reacts with the water to form calcium dihydroxide Ca(OH)$_2$, in the form of slaked lime or hydrated lime, in a reaction called hydration reaction or slaking, which is very exothermic. In the following, the calcium dihydroxide will be simply called calcium hydroxide.

Slaked lime may therefore contain the same impurities as the quicklime from which it was produced.

The quicklime may also include MgO, in a quantity comprised in the range 0.5 to 10% by weight, for preference less than or equal to 5% by weight, more preferentially less than or equal to 3% by weight, and in a preferential manner less than or equal to 1% by weight compared to the total weight of slaked lime.

The slaked lime may also include calcium oxide, which has not been completely hydrated during the slaking phase, or even calcium carbonate CaCO$_3$. The calcium carbonate may come from the initial limestone (unburnt), from which the said slaked lime is obtained (via the intermediary of calcium oxide), or may come from a partial carbonation reaction of the slaked lime when in contact with an atmosphere containing CO$_2$.

The quantity of calcium oxide in the slaked lime according to the present invention is generally less than or equal to 3% by weight, for preference less than or equal to 2% by weight, and more preferably less than 1% by weight compared to the total weight of slaked lime.

The quantity of CO$_2$ in the slaked lime (mainly in the form of CaCO$_3$) according to the present invention is generally less than or equal to 5% by weight, for preference less than or equal to 3% by weight, and more preferably less than 2% by weight compared to the total weight of slaked lime.

The slaking reaction is generally carried out in an hydrator, into which the quicklime is introduced upstream from the direction of slaking, i.e. The direction in which the lime is moved through the hydrator. The slaked lime is removed downstream from the direction of slaking. The means of transport, such as a horizontal shaft equipped with mixing blades for example, allow the lime to be moved in the direction of slaking through the hydrator, from the supply of the quicklime to removal of the slaked lime. The transport means also allows a homogeneous mixture of the lime undergoing hydration and improves the contact between water and lime in the hydrator and avoids the formation of hot spots.

Different types of hydration processes and hydrators exist, depending on the properties of the quicklime used, but also on the expected output/efficiency of the slaking reaction and the sought-after properties of the resulting slaked lime.

In order to achieve good hydration efficiency, several parameters need to be taken into account, such as the length of time the lime remains in the hydrator, the reactivity to water of the quicklime and the supply of water throughout the length of the hydrator, but also the quantity of water compared to the quantity of lime.

The reactivity of the water of the quicklime is generally characterised and measured by the procedure indicated in the European norm EN459-2 and is often quantified by the value $t_{60}$, which is the time necessary to attain a temperature of 60° C. for a volume of water of 600 cm$^3$ initially at 20° C., with the addition of 150 g of quicklime.

The components of slaked lime are currently obtained industrially by different processes depending on the quantity of water used for a given volume of lime.

In a first production process called "dry slaking mode", water is added to the hydrator in a quantity limited to that which is necessary to completely hydrate the quicklime, taking account of the fact that part of it will evaporate during the slaking reaction, due to the exothermic character of the reaction.

On leaving the hydrator, the resulting slaked lime product is a compound of standard slaked lime in the form of a powder with a BET specific surface generally comprised between 12 and 20 m$^2$/g, and including in general less than 2% by weight, even 1.5% by weight humidity (free water).

Standard slaked lime generally has numerous uses in a great number of industrial applications such as water treatment, mud conditioning, combustion gas treatment, agriculture, construction, etc.

For certain of these applications, the properties of slaked lime are particularly critical to obtain correct performance. For example, for treating combustion gas, the lime is used as sorbent for several polluting gases such as HCl, HF, SO$_x$, NO$_x$. Typically, in this case, capturing these pollutants may be carried out in dry conditions and are therefore called "dry route sorbent injection". This process consists of injecting powdered sorbents such as slaked lime, directly into the flow of combustion gas or via a filter including a fixed bed of solid particles.

However, such lime, once it has captured the pollutants, becomes a by-product which must be treated or recycled. Consequently, industrials search for high performance sorbents in order to reduce the quantity of by-product, the treatment of which is costly.

In this perspective, during the last few years, more and more products have been developed in order to control the slaked lime properties, in particular its specific surface and/or its pore volume, in order to improve its sorption capacity.

For example, documents U.S. Pat. No. 5,492,685 and WO9209528 describe slaked lime having a specific surface, obtained by slaking of quicklime with alcohol or in the presence of special additives such as (di, tri or poly-) ethylene glycol or a (di, tri or poly-) ethanolamine.

Another production process for slaked lime having a high specific surface consists of slaking the quicklime with excess water in such a way as to obtain, on leaving the hydrator, a composition of wet slaked lime with residual humidity between 15 and 35% by weight. The humid slaked lime composition is then further dried in a drying device in order to reduce the humidity content and producing a composition of dry powdery slaked lime. This process is generally called "semi-wet process" and is specifically described in documents WO97/14650 and U.S. Pat. No. 2,894,820.

More specifically in document WO97/14650, in the name of the claimant, the resulting powdery slaked lime composition is made up essentially of dried calcium hydroxide particles the residual humidity of which is less than 2% by weight of the total composition, a high specific surface (greater than 30 m$^2$/g) with a high pore volume (total pore volume by nitrogen desorption of at least 0.1 cm$^3$/g with pores having a diameter less than 1000 Angströms). This lime composition has in addition an Alpine fluidity comprised between 40 and 50% and is described as having excellent performance for treating combustion gas in installations that include a bag filter.

However, it was recently discovered that these powdery slaked lime compositions, in particular those obtained with the "semi-wet process", present insufficient fluidity for pneumatic transport, in particular those with high pore volume.

In fact, in all the processes mentioned above, during the production process, or during final use as sorbent, the powdery slaked lime composition is manipulated and transported, in particular by endless screws or by air in tubes where the particles are distributed in the gaseous phase. Subsequently, the powdery slaked lime composition is usually stored in a compressed state, for example in silos.

The fouling phenomena is a recurrent problem with slaked lime compositions during the production process, storage and later use as sorbent, in particular with a slaked lime composition having a small particle size.

In the sense of the present invention, it is understood that the term "fouling phenomena" means, a fouling and adherence problem during the production process, but also during storage, transport and later use of the powdery slaked lime composition.

The fouling phenomena are responsible for supplementary maintenance. In addition, during transport and later use, the compositions of powdery slaked lime have a tendency to adhere to the walls of the container and are difficult to remove from the walls, leading to loss of a non-negligible quantity of product. In addition, since these deposits are present on the transport line walls, application of the powdery slaked lime composition is compromised due to blockages which are difficult to eliminate.

Furthermore, environmental legislations have, in general, been considerably reinforced, in terms of quantity of pollutant authorised in the combustion gas and in terms of treating the by-products, which obliges industrials to find solutions with improved sorption capacity.

In this perspective, we know that it is necessary to reduce the particle size of powdery slaked lime in order to improve advantageously its sorption properties. In fact, the compositions of powdery slaked lime include smaller particles showing greater treatment efficiency. More precisely, the treatment of combustion gas is improved due to better dispersion of the powdery composition in the gaseous phase (combustion gas) and quicker contact between the pollutant and the lime composition particles. In addition, the smaller particles present a greater external contact surface, thereby increasing the proportion of hydrated lime which really enters into contact with the pollutants to be captured.

However, the fluidity of a powder generally diminishes when the particle size of the powder diminishes. In fact, the smallest particles are known to provoke a reduction in the powder fluidity due to the important interaction between the particles which are responsible for cohesion of the powder. This is well illustrated in Geldart et al. which teaches us that the flow properties of powder measured with different flow behaviour apparatus indicate that flow behaviour is more difficult when particle size is reduced. In fact, this document shows that the cohesion tester of Warren Spring Bradford (WSBCT), the cohesion indicator of Johanson and the poured angle of repose and the cohesion of Jenike all show an increase in value with smaller particles (Geldart Geldart, D.; Abdullah, C E; Verlinden, A. Characterisation of Dry Powders, *Powder Technol.* 2009, 190 (1-2), 70-74). Consequently, until now, the skilled tradesman has still been forced to make a compromise between improved sorption properties and sufficient fluidity of his powdery sorbent.

Consequently, there is a need to obtain a composition of highly porous powdery slaked lime, which has small size particles in order to improve the sorption capacity of the compound, but avoiding or at least reducing the fouling phenomena.

According to the present invention, the powdery slaked lime composition provides a solution to this need by using a powdery slaked lime composition, as mentioned at the beginning, characterised in that the composition possess in addition an Alpine fluidity greater than 50%, in particular greater than or equal to 51%, for preference greater than or equal to 52% and advantageously greater than or equal to 54%, in particular greater than or equal to 55%, the above mentioned composition including a first fraction of particles of size less than 32 µm and a second fraction of particles greater than 32 µm, the second fraction being less than 10% by weight, compared to the total weight of the composition.

For simplicity, the term "second fraction of particles greater than 32 µm" is also expressed as $R_{32}$ in the rest of the specification for the retained fraction at 32 µm.

By the term "fluidity", often called flowability, it is understood in the present invention, the ability of a powder to flow freely, in a regular and uniform manner, in the form of individual particles.

The fluidity of the powdery slaked lime composition according to the present invention is measured on an Alpine air jet sieve. This Alpine fluidity characterises the static fluidity of a powder and is determined by the speed at which particles having a diameter less than 90 µm pass through a 90 µm sieve (170 mesh) under the force of aspiration. The Alpine fluidity expressed as a % corresponds to the ration between the weight of the fraction less than 90 µm which passes the sieve in 15 seconds (depression of 100 mm of manometric liquid, the density of which is 0.88) and the total weight of the fraction less than 90 µm which passes the sieve after an additional 2 minutes (depression of 150 mm of manometric liquid, density 0.88).

The behaviour of powder in a storage silo may be simulated with another method using a rheometer for powder, such as the Brookfield powder flow tester (PFT) according to the ASTM D6128 norm. In this method, a powder sample is introduced into the equipment and is subjected to compaction increasing over time. At each compression stage (principal consolidation stress), a specific torque is applied to the powder until failure (non confined failure restriction). The response of the powder to the restriction applied is recorded on a computer, which evaluates the static cohesion of the tested sample. The results are shown by a graph which is compared to the ASTM references.

According to the invention, the powdery slaked lime composition is also characterised by its dynamic fluidity which may be measured using the Granudrum apparatus. In this method, a certain quantity of powdery material is placed in a drum fitted with transparent windows, which is rotated and accelerated by stages from 0 to 20 rpm, then decelerated in stages. The form of the pill of powder rotating (interface air/powder) inside the drum is analysed by an algorithm. A dynamic flow angle and an indice of dynamic cohesion are determined for each rotation speed.

According to the present invention, it has been shown in an amazing way, that it is possible to obtain a highly porous composition of According to the present invention, it has been shown in an amazing way, that it is possible to obtain a highly porous composition of powdery slaked lime with high sorption capacities due to the small particle size, but which presents, however, high fluidity due to the reduced fouling phenomena.

In fact, typically, when the experienced tradesman wishes to reduce the fouling phenomena, he tends to use larger size particles, generally leading to higher fluidity of the lime composition.

The fluidity of the powder is, amongst others, controlled by the size of particles that make up this powder (see article "Flow properties of powders and bulks solids", Dietmar Schulze http://dietmar-schulze.de/grdle1.pdf).

In particular, the fluidity of a powder generally diminishes when the particle size (for example the diameter) of the powder diminishes.

The size of particles in powdery slaked lime composition depends on different parameters.

The first parameter influencing particle size is the size of the initial particles of quicklime which is used to form the slaked lime. In addition, the speed of the hydration reaction and the temperature inside the hydrator are also essential factors which control the hydration reaction and consequently the size of the particles in the final powdery slaked lime composition.

To obtain a carefully controlled particle size in a highly porous powdery slaked lime composition is therefore very complicated as it depends on several difficult to control parameters, in particular during the course of the slaking process to form the powdery slaked lime composition.

For a powder of a given chemical composition, different flow behaviour may be obtained, depending on the size and form of the particles making up the powder. Very small particles usually lead to the formation of a cohesive powder because these small particles present stronger electrostatic. Van der Walls and/or greater cohesion forces compared to other forces such as gravitational or shearing. Increasing the diameter of the particles reduces the relative contribution of the electrostatic, the Van der Walls and cohesion forces, which renders powder flow easier.

For these reasons, the fluidity of the powdery slaked lime composition depends on multiple parameters, certain of which are difficult to control.

However, the powder fluidity is an essential parameter characterising a powdery composition because a powder that is not fluid may lead to a fouling phenomenon during the production process and during storage of the powder, but also during later use of the powder.

In addition, after the slaking phase, the slaked lime may be treated in driers and grinders which may notably influence size distribution, but also the form of the powdery slaked lime particles and consequently, influence the powder fluidity.

Furthermore, due to the high temperature used during the powder drying, the internal structure of the powdery slaked lime may also be modified, and therefore, the drying stage may also modify the porosity characteristics of the powder.

As can be seen, obtaining a powdery slaked lime composition presenting properties that are controlled and reproducible with time, in particular a special texture (high porosity) to improve the sorption capacity, but at the same time a distribution of small particles and good fluidity, remains as of today a challenge.

Furthermore, fluctuations in terms of fluidity of the powdery slaked lime composition are not acceptable in an industrial process as this may lead to variations in productivity, and also unforeseen fouling phenomena in the installation.

The powdery slaked lime composition of the present invention conserves excellent sorption properties due to the high porosity, i.e. A BET specific surface obtained by adsorption of nitrogen, greater than or equal to 25 m$^2$/g, and a BJH total pore volume greater than or equal to 0.15 cm$^3$/g.

The sorption properties of powdery slaked lime composition according to the present invention are, in addition, improved by the distribution of particle size of the composition characterised by an $R_{32}$ less than 10% by weight compared to the total weight of the composition. With such a distribution of particle size, the efficiency of the treatment, in particular the treatment of combustion gas is improved due to better dispersion of the powdery composition in the gaseous phase (combustion gas) and quicker contact between the pollutant and the lime composition particles according to the present invention. On the other hand, the smaller particles present a greater external contact surface, thereby increasing the proportion of hydrated lime which really enters into contact with the pollutants to be captured.

Unfortunately, as explained previously in the description, a reduction in particle size of a composition of powdery slaked lime generally leads to the formation of a cohesive powder presenting low fluidity and which therefore is difficult to handle and is responsible for fouling phenomena, in particular during its transport and its later industrial application and may also result in a loss of its high porosity properties.

However, it has been shown in an amazing way according to the present invention that a composition of very porous slaked lime made up of particles the size of which is less than 32 μm, with an $R_{32}$ less than 10% by weight of the total weight of the composition may present improved fluidity. The powdery slaked lime composition according to the present invention, in addition to its very good sorption properties, presents high fluidity, which signifies that the powder is easier to handle, to transport, to store and consequently, the fouling phenomena or blockage are considerably reduced during the production process or later use, thus reducing the costs caused by maintenance problems or production installations or during its later use.

Another advantage of the powder according to the present invention is the reduction of product loss provoked by the fact that the powder may adhere to the internal walls of the production process, during storage, transport or in later use.

Increasing the powder fluidity according to the present invention allows the adhesion phenomena to be avoided or at least reduced.

In fact, it has been identified in the present invention that, to obtain a powdery slaked lime composition with dynamic fluidity (measured by a granudrum) sufficient to avoid the fouling and adhesion phenomena during transport and later industrial use, the aforesaid powdery slaked time composition should present an Alpine fluidity greater than 50%. The Alpine fluidity AF is defined by the equation $$AF = \frac{m_i - m_{R90(T15;P100)}}{m_i - m_{R90(T120;P150)}} \cdot 100$$

where:
- $m_i$ is the initial mass of 50 g of powder spread over a 90 μm sieve;
- $m_{R90(T15;P100)}$ is the mass of residues of material left on the sieve after 15 seconds with a depression of 100 mm of manometric liquid, the density of which is 0.88;
- $m_{R90(T120;P150)}$ is the mass of residues of material left on the sieve after 15 seconds with a depression of 100 mm of manometric liquid, the density of which is 0.88, and after 120 seconds with the depression at 150 mm of manometric liquid with a density of 0.88.

In a special production mode, the powdery slaked lime composition according to the present invention includes particles having a BET specific surface obtained by the adsorption of nitrogen greater than or equal to 30 m²/g, for preference greater than or equal to 32 m²/g, and in an advantageous manner greater than or equal to 35 m²/g.

In a particularly preferred production mode, the powdery slaked lime composition, according to the present invention, has a BET specific surface obtained by nitrogen adsorption of less than or equal to 55 m²/g, in particular less than or equal to 50 m²/g.

By the expression (BET specific surface), we mean according to the present invention, the specific surface measured by manometry with nitrogen adsorption at 77 K after degassing under vacuum at a temperature lying between 150 and 250° C., notably at 190° C. for at least 2 hours and calculated according to the multipoint BET method described in the ISO 9277:2010E norm.

In addition, in a special production mode, the powdery slaked lime composition according to the present invention has a total BJH pore volume made up of pores having a diameter less than 1000 Å, obtained by the adsorption of nitrogen, greater than or equal to 0.17 cm³/g, in particular greater than or equal to 0.18 cm³/g, for preference greater than or equal to 0.19 cm³/g, in particular greater than or equal to 0.20 cm³/g, and in an advantageous manner greater than or equal to 0.21 cm³/g.

In an advantageous manner, the powdery slaked lime composition of the invention has a total BJH pore volume made up of pores having a diameter less than 1000 Å, obtained by nitrogen desorption, less than or equal to 0.30 cm³/g, and in particular less than 0.28 cm³/g.

In a special production mode, the powdery slaked lime composition according to the present invention has a total BJH pore volume made up of pores having a diameter between 100 and 300 Å, obtained by nitrogen desorption, greater than or equal to 0.07 cm³/g, for preference greater than or equal to 0.10 cm³/g, in a beneficial manner greater than or equal to 0.11 cm³/g, in particular greater than or equal to 0.12 cm³/g, and typically less than 0.15 cm³/g, and in particular less than 0.14 cm³/g.

In a beneficial method, the powdery slaked lime composition according to the present invention has a total BJH pore volume made up of pores having a diameter between 100 and 400 Å, obtained by nitrogen desorption, greater titan or equal to 0.09 cm³/g, for preference greater than or equal to 0.12 cm³/g, in an advantageous manner greater than or equal to 0.13 cm³/g, in particular greater than or equal to 0.14 cm³/g, and typically less than 0.17 cm³/g, and in particular less than 0.16 cm³/g.

By the expression "BJH pore volume", we mean according to the present invention, the pore volume measured by manometry with nitrogen adsorption at 77 K after degassing under vacuum at a temperature lying between 150 and 250° C., notably at 190° C. for at least 2 hours and calculated according to the BJH method using the desorption graph, with the hypothesis of a cylindrical pore geometry.

By the term "total pore volume", according to the present invention, we mean the BJH pore volume made up of pores having a diameter less than or equal to 1000 Å.

In a beneficial method, the powdery slaked lime composition according to the present invention presents in addition a particle size $d_{50}$ less than or equal to 8 μm, for preference less than or equal to 6 μm, and advantageously less than or equal to 4 μm.

The notation dx represents a diameter expressed in μm, measured by laser granulometry in methanol after sonication, compared to which the size of X % by volume of the particles measured are less than or equal to this diameter.

In a particular production mode, the powdery slaked lime composition according to the present invention presents a non-solid content in the residual phase.

In a beneficial method, the said non-solid residual phase includes water and/or residual additives (inorganic and/or organic), free or linked to the lime compound.

By the term "content in non-solid residual phase of the slaked lime composition", according to the present invention, we mean the proportion of the non-solid residual phase of the slaked lime (i.e. The humidity content, such as content of free water, and/or residual additive content resulting from the production process of the said slaked lime composition, i.e. Coming from the additives added before, during or after slaking of the quicklime) determined by a loss of ignition test.

The loss of ignition test consists of heating, under atmospheric pressure about 20 g of the powdery slaked lime composition to a predetermined temperature, i.e. 110° C. or 180° C. and to measure the weight over time of the powdery composition by means of a thermal balance until the weight of the powder does not vary by more than 2 mg for at least 20 seconds. Whilst heating the powder, all the components, in particular the non-solid components, having an evaporation temperature lower than that applied in the test, are eliminated from the powder and consequently, their content corresponds to the loss of weight measured during the test. Consequently, the non-solid residual phase contains all the non-solid components, notably the liquid components all having an evaporation temperature lower than the temperature applied, which will then be eliminated from the slaked lime composition during the heating process at the predetermined temperature. The % by weight of the non-solid residual phase and the remaining solid, called dry extract, are both calculated as a function of the product weight before and after the ignition test and are both expressed compared to the weight of product before the ignition test.

The loss of ignition test result may vary as a function of the temperature used during the test. For example, it may be higher at 180° C. than at 110° C. if additives are used during or after the staking process, and if these additives or their derived phases present an evaporation point greater than 110° C. and less than 180° C., or form with free water an azeotropic substance or an aqueous mixture which evaporates between these temperatures.

The non-solid content in residual phase of the powdery slaked lime composition according to the present invention may be measured by a loss of ignition test at 180° C. In such a case, the loss of ignition test result is greater than or equal to 0.3% by weight, for preference greater than or equal to 0.5% by weight and less than or equal to 5% by weight, for preference less than or equal to 4.5% by weight, in particular less than or equal to 4% by weight and represents a quantity of water and/or substances contained within having an evaporation point less than or equal to 180° C.

The non-solid content in residual phase of the powdery slaked lime composition according to the present invention may be measured by a loss of ignition test at 110° C. In such a case, the value of the ignition test loss is less than or equal to 3.5% by weight, preferably less or equal to 3.0% by weight, in a beneficial manner less than or equal to 2.5% by weight, in particular less than or equal to 2.0% by weight, notably less than or equal to 1.5% by weight and greater than 0% by weight, for preference greater than or equal to 0.3% by weight, in particular greater than or equal to 0.5% by weight and principally represents a quantity of water and/or volatile substances contained within having an evaporation point less than or equal to 110° C., in particular water.

In a particularly preferred production mode, the powdery slaked lime composition according to the invention presents in addition an alkaline phase characterised by an alkaline metal intent greater than or equal to 0.2% by weight and less then or equal to 3.5% by weight compared to the total weight of the powdery slaked lime composition.

The alkaline phase may be in an ionic form or in a linked form. Different types of salt may be added before, during and/or after the slaking process, in particular a compound of alkali metal chosen from the group made up of hydroxides, carbonates, hydrogen carbonates, nitrates, phosphates, persulphates and monocarboxylates and their mixtures, in particular those of sodium, potassium and/or lithium.

In another production mode, the powdery slaked lime composition according to the present invention includes in addition inorganic solid additives and/or residual organic solids.

For preference, the residual organic solid additives may come from organic additives added before, during and/or after the slaking process and chosen from the group of (mono) or (poly) ethylene glycol or (poly) ethanolamine, in particular the triethylene glycol, the triethanolamine, and calcium stearate and their mixtures.

The particles of powdery slaked lime composition of the present invention are composed mainly of hydrated lime, also known by its name of slaked lime, resulting from the treatment of quicklime with water in order to convert the oxides to hydroxides. Depending on the type of quicklime used, the hydrated lime of the present invention may be hydrated lime rich in calcium or dolomitic.

The powdery slaked lime composition of the present invention may contain the same impurities as those in the quicklime from which it is produced, such as magnesium oxide, MgO, sulphur oxide, $SO_3$, silica, $SiO_2$, or even alumina, $Al_2O_3$ . . . , the sum of these being several % in weight. Here the impurities are expressed in their oxide form, but obviously, they may appear in different phases.

In particular, the slaked lime according to the present invention may also include magnesium in the form MgO, and/or $Mg(OH)_2$ in a quantity comprised in the range 0.5 to 10% by weight, for preference less than or equal to 5% by weight, more preferably less than or equal to 3% by weight, and in a preferential manner less than or equal to 1% by weight, expressed in the form of oxide, compared to the total weight of slaked lime.

The slaked lime may also include calcium oxide, which has not been completely hydrated during the slaking phase, or even calcium carbonate $CaCO_3$. The calcium carbonate may come from the initial limestone (unburnt), from which the said slaked lime is obtained (via the intermediary of calcium oxide), or may come from a partial carbonation reaction of the slaked lime when in contact with an atmosphere containing $CO_2$.

The quantity of calcium oxide in the slaked lime according to the present invention is generally less than or equal to 3% by weight, for preference less than or equal to 2% by weight, and more preferably less than 1% by weight compared to the total weight of slaked lime.

The quantity of $CO_2$ in the slaked lime (mainly in the form of $CaCO_3$) according to the present invention is generally less than or equal to 5% by weight, for preference less than or equal to 3% by weight, and more preferably less than 2% by weight compared to the total weight of slaked lime.

In the preferred production mode, the quantity of lime available present in the powdery slaked time composition according to the present invention is greater than or equal to 85% by weight, for preference greater than or equal to 87% by weight preferentially greater than or equal to 90% by weight, in an beneficial manner greater than or equal to 92% by weight, and even greater than or equal to 95% by weight compared to the dry matter content of the slaked lime composition after LOI at 180° C.

In another preferred production mode, the % by weight of the remaining slaked lime composition mainly includes components of limestone origin coming from the non-solid residual phase.

By the term "quantity of lime available", we mean in the present invention, the quantity of calcium hydroxide and/or calcium oxide present in the powdery slaked lime composition, measured by a method described in the EN-459-2 2010 norm. More precisely, in the present invention, the available lime content present in the powdery slaked lime composition is determined by placing 0.5 g of the powdery slaked lime composition into a sugar solution (15 g of sugar in 150 $cm^3$ of demineralised water). The sugar solution will dissolve the available lime (i.e. the calcium oxide and/or the calcium hydroxide), contained in the sample. The resulting mixture is stirred for at least 10-15 minutes to ensure complete dissolution, then titrated with a solution of hydrochloric acid (HCl 0.5N), with phenolphthalein being used as indicator. The concentration in Ca measured by this titration is then expressed in the form $Ca(OH)_2$.

Other forms of making the powdery slaked lime composition according to the invention are indicated in the attached claims.

The invention also concerns a composition of industrial sorbent including at least the said composition of slaked lime according to the invention.

Other forms of making the industrial sorbent composition according to the invention are indicated in the attached claims.

The invention also concerns use of the powdery slaked lime composition according to the present invention to purify combustion gas.

In particular, the powdery slaked lime composition is used in a dry route injection of sorbent.

In an advantageous manner, the powdery slaked lime composition according to the present invention is used to capture acid combustion gas pollutants, such as HCl, HF, $SO_x$, $NO_x$.

In a particular production mode, the powdery slaked lime composition according to the present invention is used in the industrial sorbent composition, for example combined with at least one other sorbent generally known for the treatment of combustion gas, such as a sorbent chosen from the list of organic compositions, in particular active charcoal, lignite coke and their mixtures, and inorganic compositions, in particular inorganic compositions known for capturing dioxins, furans and/or heavy metals, such as halloysite, sepiolite, bentonite or any other sorbent described in the demand DE 4034417.

Other forms of making use of it according to the invention are indicated in the attached claims.

The composition of the powdery slaked lime may in particular be produced, but without being limited, by a process including the stages consisting of:
introducing the quicklime in a supply zone of the hydrator;
introducing water into the supply zone of the hydrator;
slake the aforesaid quicklime in an slaking zone of the hydrator by using a quantity of water sufficient to obtain a slaked lime having a content of non-solid in residual phase lying between 15 and 55% by weight, for preference between 15 and 35% by weight;
dry and grind the said slaked lime to form the powdery slaked lime compositions.

This process in characterised in that the aforesaid stages of drying and grinding are carried out simultaneously and are a unique stage of fluxing/fluidisation of slaked lime to form the aforesaid composition of powdery slaked lime having an Alpine fluidity greater than 50%, the Alpine fluidity AF being defined by the equation $$AF = \frac{m_i - m_{R90(T15;P100)}}{m_i - m_{R90(T120;P150)}} \cdot 100$$

where:
$m_i$ is the initial mass of 50 g of powder spread over a 90 μm sieve;
$m_{R90(T15;P100)}$ is the mass of residues of material left on the sieve after 15 seconds with a depression of 100 mm of manometric liquid, the density of which is 0.88;
$m_{R90(T120;P150)}$ the mass of residues of material left on the sieve after 15 seconds with a depression of 100 mm of manometric liquid, the density of which is 0.88, and after 120 seconds with the depression at 150 mm of manometric liquid with a density of 0.88.

The aforesaid stages of drying and grinding being carried out in a drier/grinder chosen from the group including pin mill drier grinders, cage drier/grinders, instantaneous dryer-disagglomerator, and a combination of these until the powdery slaked time composition includes a first fraction of particles the size of which is less than 32 μm and a second fraction of panicles the size of which is greater than 32 μm, the second fraction being less than 10% by weight of the total weight of the composition.

By the term "instantaneous drier-disagglomerator", we mean a device for instantaneous drying inside which there is a rotor or rotating blades at the bottom of the drying chamber which fluidifies the product and creates turbulence in the hot air stream which penetrates tangentially the drying chamber. Because of this, the wet slaked lime (agglomerated) is rapidly dispersed and disintegrated into fine dry particles. The resulting fine particles leave the drying chamber by the upper part, whereas the larger particles remain in the chamber for additional drying and disagglomeration.

Examples of instantaneous drier/disagglomerators notably include the Anhydro Spin Rash Dryer®, commercialised by SPX FLOW, the Drymeister® instantaneous drier, commercialised by Hosokawa Micron Group or the Swirl Fluidizer™ drier commercialised by the GEA Group.

For preference, the drying/grinding stages are continued until the powdery slaked lime composition presents a particle size $d_{50}$ less than or equal to 8 μm, or in an beneficial manner less than or equal to 6 μm, and in particular less than or equal to 4 μm.

In an advantageous manner, the drying/grinding stages are continued until the powdery slaked lime composition presents a non-solid residual phase content, measured by a loss of ignition test at 180° C., less than or equal to 5% by weight, for preference less than or equal to 4.5% by weight, in particular less than or equal to 4% by weight, and greater than or equal to 0.3%, for preference greater than or equal to 0.5% by weight, compared to the total weight of powdery slaked time composition.

The invention is now going to be described in greater detail by means of non-limiting examples.

EXAMPLE 1

A highly porous and fine powdery slaked lime composition according to the present invention is produced industrially by mixing water and quicklime (2.7 t/h of quicklime) in a hydrator, in quantities such that the product leaves the hydrator with a non-solid residual phase, measured by a loss of ignition (LOI) test at 180° C., comprised between 22 and 24% by weight. 0.2% of diethylene glycol (expressed as % by weight of quicklime) is added to the slaking water before hydration. The wet slaked lime which leaves the hydrator in then transported towards a pin mill into which hot air is injected in order to instantly dry the wet slaked lime and to produce the highly porous powdery slaked lime before storage.

The resulting powdery slaked lime composition has an Alpine fluidity of 51%, a $d_{50}$ of 4.2 μm and a particle fraction the size of which is greater than 32 μm ($R_{32}$) and is 6.2% by weight. Its specific surface and total pore volume are respectively 41.1 m²/g and 0.214 cm³/g.

Even though the preferred production modes of the invention have been described as an illustration, the knowledgeable tradesman knows that various modifications, additions or substitutions are possible, without moving away from the spirit of the invention such as described in the claims appendices.

The invention claimed is:

1. Powdery slaked lime composition having a BET specific surface, obtained by nitrogen adsorption, greater than or equal to 25 m²/g and a total BJH pore volume, constituted of pores the diameters of which are less than 1000 Å, obtained by nitrogen desorption, greater than or equal to 0.15 cm³/g, characterised in that this composition possesses in addition an Alpine fluidity greater than 50%, the Alpine fluidity AF being defined by the equation:

$$AF = \frac{m_i - m_{R90(T15;P100)}}{m_i - m_{R90(T120;P150)}} \cdot 100\%$$

where:
- $m_i$ is an initial mass of 50 g of powder spread over a 90 µm sieve;
- $m_{R90(T15;P100)}$ is a mass of residues of material left on the sieve after 15 seconds with a depression of 100 mm of manometric liquid, the density of which is 0.88;
- $m_{R90(T120;P150)}$ is a mass of residues of material left on the sieve after 15 seconds with a depression of 100 mm of manometric liquid, the density of which is 0.88, and after 120 seconds with the depression at 150 mm of manometric liquid with a density of 0.88;

and the aforementioned composition includes a first fraction of particles having a size less than 32 µm and a second fraction of particles with the size greater than 32 µm, the second fraction of particles being less than 10% by weight, compared to the total weight of the composition, said powdery slaked lime composition further comprises residual organic solid additives coming from organic additives selected from the group consisting of mono- or poly-ethylene glycol and their mixtures.

2. The powdery slaked lime composition according to claim 1, presenting in addition a non-solid residual phase content, measured by a loss of ignition test at 180° C., greater than or equal to 0.3% compared to the total weight of powdery slaked lime composition.

3. Powdery slaked lime composition according to claim 2, in which the said non-solid residual phase includes water and/or residual additives, such residual additives being inorganic and/or organic additives, free or linked to the lime compound.

4. The powdery slaked lime composition according to claim 1, presenting in addition a non-solid content in residual phase, measured by a loss of ignition test at 110° C., less than or equal to 3.5% by weight and greater than 0% by weight compared to the total weight of the powdery slaked lime composition.

5. The powdery slaked lime composition according to claim 1, presenting in addition a particle size $d_{50}$ less than or equal to 8 µm.

6. The powdery slaked lime composition according to claim 1, characterised in that the said composition has a BET specific surface obtained by the adsorption of nitrogen greater than or equal to 30 m²/g.

7. The powdery slaked lime composition according to claim 1, characterised in that the said composition has a BET specific surface obtained by the adsorption of nitrogen less than or equal to 55 m²/g.

8. The powdery slaked lime composition according to claim 1, characterised in that the said composition has a total BJH pore volume made up of pores having a diameter less than 1000 Å, obtained by nitrogen desorption, greater than or equal to 0.17 cm³/g.

9. The powdery slaked lime composition according to claim 1, characterised in that the said composition has a total BJH pore volume made up of pores having a diameter less than 1000 Å, obtained by nitrogen desorption, less than or equal to 0.30 cm³/g.

10. The powdery slaked lime composition according to claim 1, characterised in that the said compound has a BJH pore volume made up of pores having a diameter between 100 and 300 Å, obtained by nitrogen desorption, greater than or equal to 0.07 cm³/g and less than 0.15 cm³/g.

11. Composition of industrial sorbent including at least the said powdery slaked lime composition according to claim 1.

* * * * *